Oct. 11, 1955  G. M. BOOTH  2,720,314
FILTER WITH AIR BUMP BACKWASH MEANS
Filed Dec. 1, 1951  2 Sheets-Sheet 2
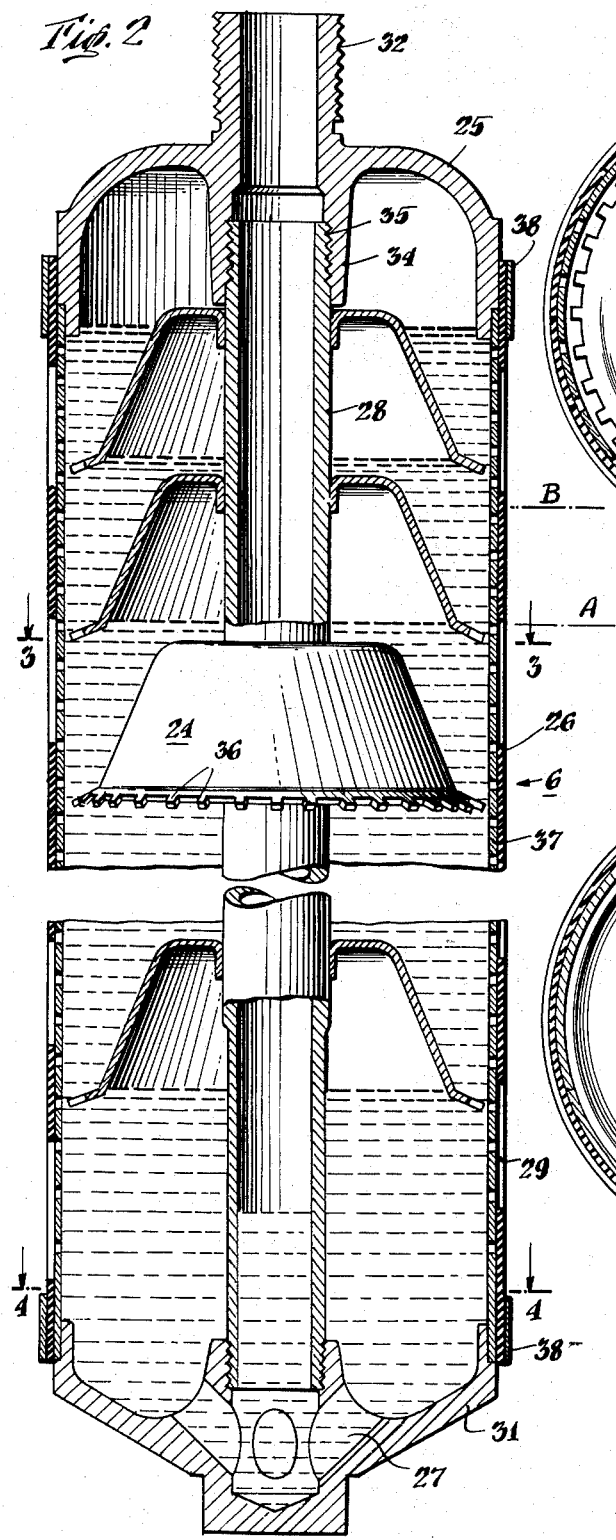
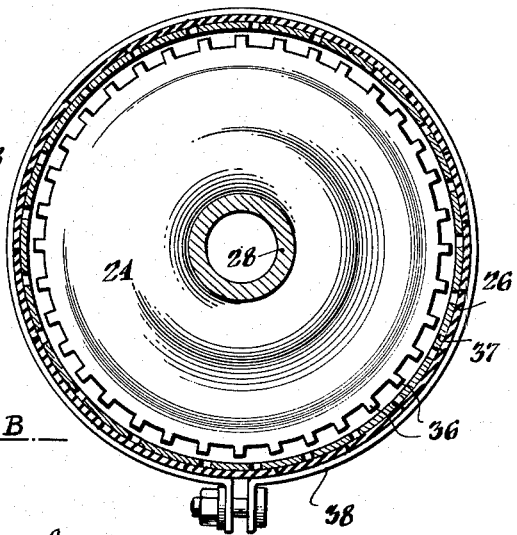
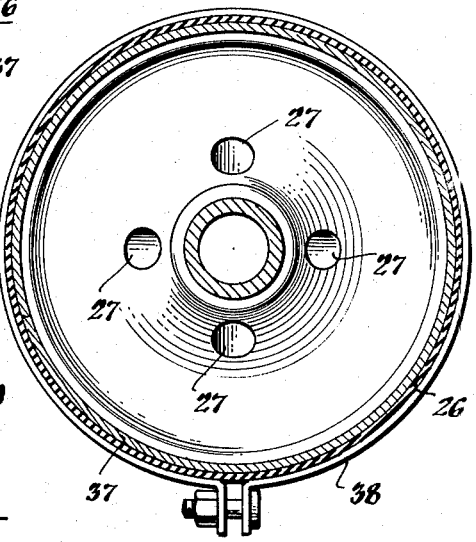
INVENTOR.
George M. Booth
BY
Robert S. Dunham
ATTORNEY United States Patent Office 2,720,314
Patented Oct. 11, 1955

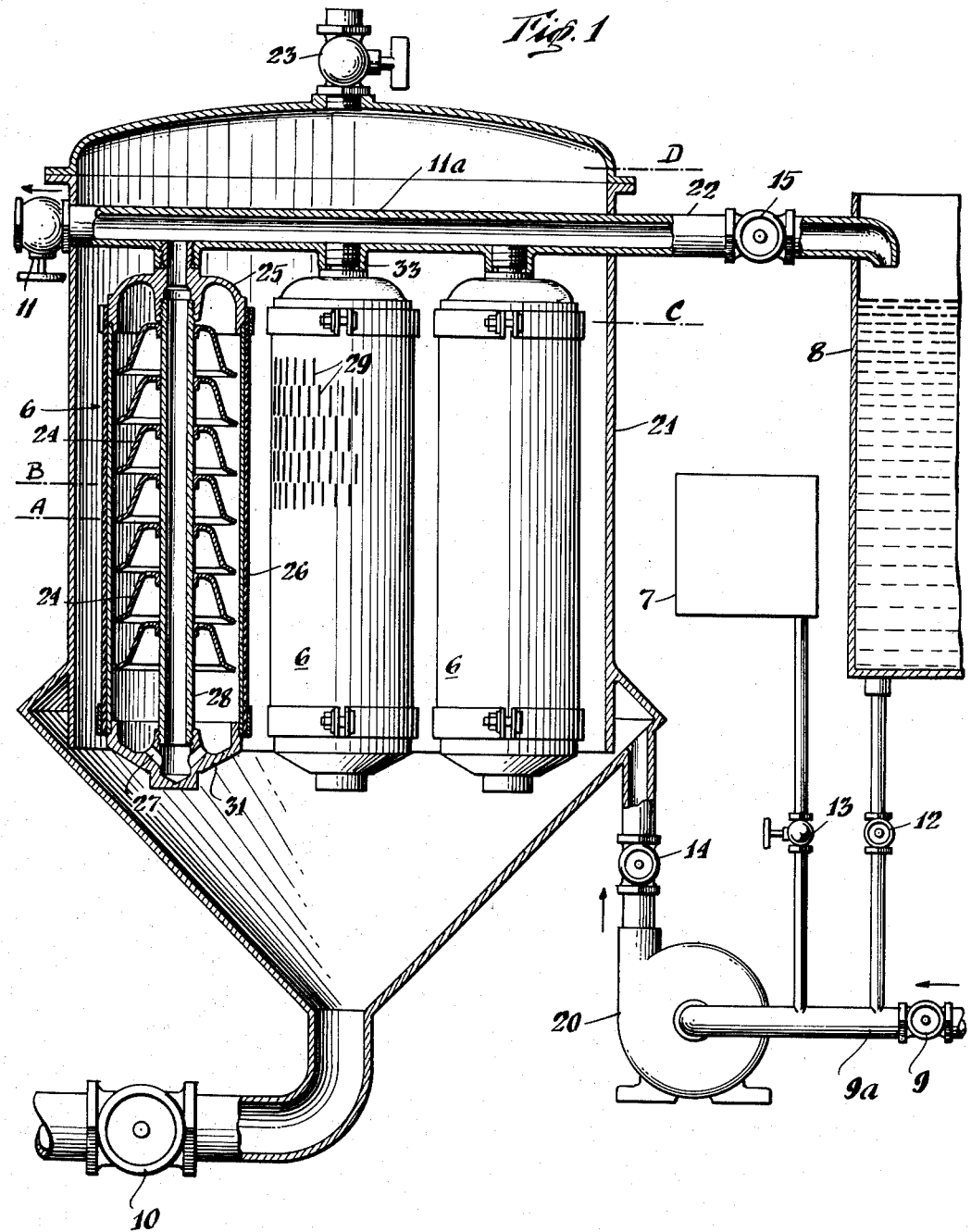

2,720,314

FILTER WITH AIR BUMP BACKWASH MEANS

George M. Booth, Westfield, N. J., assignor to Wallace & Tiernan Incorporated, a corporation of Delaware Application December 1, 1951, Serial No. 259,451

13 Claims. (Cl. 210—184)

This invention relates to filters. It has as its principal object the provision of means by which improved backwashing and cleaning action may be obtained in such apparatus.

In the past, backwashing in order to clean filters of the sort hereby disclosed has been accomplished in various ways, among which one unusually effective method has involved a so-called "air bump." Means and procedure for effectuating such "air bump" backwashing are disclosed and claimed in my United States Patent No. 2,423,172, granted July 1, 1947. By "air bump" operation, it is contemplated that a pocket of air above the liquid in the effluent filter chamber be compressed, and preferably likewise a pocket of air above the liquid in the influent chamber, so that upon sudden release of pressure on the influent side, as by suddenly opening the influent air pocket to the atmosphere (while the outlet from the effluent chamber is closed), an immediate, rapid, reverse flow of filtrate is caused through the filter septums. By means of the reverse flow, which is at high velocity because of the sudden release of the energy which has been stored as described above, the surfaces of the filters may be effectively cleaned. Such operation is appropriate for various types of filters but is particularly adapted for those wherein a coating of diatomaceous earth or other filter aid material is built up on the influent side of the filter septums and is to be cleaned away, with its accumulated load of impurities, by the backwashing. However, while certain apparatus of the stated character can be made to operate very effectively and while in every case the air bump process of my aforementioned patent has represented an improvement in the backwashing of filters, some drawbacks have been found in employing the air bump method, especially with some types of equipment that might otherwise be very desirable. Chief among these difficulties is that this high velocity backwashing appears to become less effective progressively down the length of each filter, which is usually an upright cylindrical element backwashed from the inside, so that in time the filters tend to become progressively more clogged at their lower ends. The reason for this effect appears to be that the upper ends of the filter elements or septums are more accessible to the moving backwash water. Indeed, it is now believed that a large portion of the backwash water passes out through the upper part of the septums before the inertia of the water inside the lower part of the septums is overcome and is set in motion.

One way of overcoming this difficulty is to employ short length, large diameter filter elements, but, while these are satisfactory in small or single unit devices, they entail a construction that does not lend itself to making a practical, compact plural-septum unit of large capacity. That is to say, the short, wide vessels thus found superior to support or constitute the septum units cannot be grouped very efficiently in a filter shell or housing of practical shape and dimensions, and are therefore rather unsatisfactory as elements to make up a desirably large filter area in filter units of larger size. By means of the present invention, however, a simple compact unit may be constructed employing any desired length of filters, e. g. of upright cylindrical configuration.

Indeed, the chief object of the invention is to provide a filter element, as of tubular shape, which can be of unlimited length and yet will permit effective backwashing at all localities by the air bump operation herein described. That is to say, by the utilization of the present invention, there is practically no limit to the length of the filter element that may be employed, while affording storage of energy in such fashion as to achieve equally satisfactory backwashing throughout. For large-capacity filters, for example, unusual efficiency, and economy and convenience of manufacture, are achieved with very long, tubular elements, yet heretofore it has been extremely difficult if not impossible, to obtain a thorough reverse flow uniformly throughout the length of such devices; by the present construction, however, the stored energy for backwashing is rendered distributively effective at all localities of the element, no matter how long.

In addition to the principal object of providing improved filter apparatus, of practical shape and construction, as explained above and having novel and more efficient means for the effectuation of backwashing, another object of the present invention is to be able to cause any particles which may penetrate the filter surface, especially particles of filter aid that often pass through the septum during the pre-coating operation, to be washed entirely through the apparatus and not allowed to settle at the bottom of each filter element.

A further object of this invention is to eliminate the use of a tube sheet in the compartment containing the filter units, and hence have a less expensive and simpler construction or a construction that is more convenient to assemble and service.

These and other advantages may more fully appear as the description of a specific embodiment of this invention progresses, such embodiment being set forth by way of example to illustrate the features of improvement and their principles of operation.

In the drawings:

Fig. 1 is a somewhat diagrammatic side elevational view, partly in cross section, of a complete filter unit in use in this system;

Fig. 2 is an enlarged side elevational view mostly in cross section showing a filter support member;

Fig. 3 is a plan view in section of a filter support taken along the line 3—3 of Fig. 2 looking in the direction of the arrows; and Fig. 4 is another plan view in section near the bottom of a filter support taken along the line 4—4 of Fig. 2 looking in the direction of the arrows.

To explain the operation of a system utilizing the apparatus of this invention and basically similar to the system shown in my above-mentioned patent, reference will first be made to Figs. 1 and 2. Referring to Fig. 1, a filter support 6 will be described in use in a filter system in which any desired number of such supports 6 may be contained in a main tank or shell 21, which makes up the body of a filter unit. At the beginning of a run of the system, a bed of filter material, such as diatomaceous earth or similar substance, must be built up on the outside surfaces of the supports 6. The particle size of the diatomaceous earth is usually such that individual particles are smaller than the openings in the sides of the filter supports, e. g. the openings in the septums which constitute the outer surface of the support assemblies. However, these particles tend to form bridges over the septum openings and thereby build up a filter bed which acts very effectively in separating and collecting undesired matter from the liquid being filtered. This filter material may be introduced from a slurry feeder 7 or might be directly introduced into a tank 8. In either case, at the start of a run, a heavy concentration of filter material is introduced into the stream of liquid being circulated. During this build-up of the filter bed, line input valve 9 will be closed as will drainage valve 10 and line filtrate output valve 11, it being understood that the system is arranged, in ultimate use, for filtering operation on liquid, such as water, supplied through the valve 9 and pipe 9a and discharged (e. g. for use or further distribution) through valve 11 in one outlet of the header pipe 11a, the pump 20 being adapted to advance such liquid continuously through the apparatus. The tank 8 should hold sufficient liquid, e. g. water, to be able to fill the filter unit (main tank) 21 to its operating levels as described below and also to provide circulation of liquid back to the tank 8. Thus, during the pre-coating step, valves 12, 13, 14 and 15 are open in order to allow the necessary circulation of water as follows: from tank 8 through the circulation pump 20, into the main filter tank 21, through the filter surfaces or septums of the supports 6, and back to the tank 8 by means of the pipe 22. Then, as soon as sufficient filter bed or layer has built up on the surfaces of the units 6, valve 13 is closed, or left slightly open to supply a small continuous addition to the layer on each unit during the actual run, and the water is circulated until it runs clear.

The next step is to begin the actual filter run by closing valves 12 and 15 and opening line valves 9 and 11. The flow of water, as indicated above, enters through the pipe 9a under the action of the pump 20 which advances the water into the filter shell and then through the filter aid material and through the septums respectively carrying it, into the interiors of the cylindrical supports 6 from which the filtered water is delivered to (and through) the valve 11. In order to provide the eventual backwashing by the preferred process of my cited patent, the structures and water levels in the filter unit are so arranged that during the entire run, air pockets are maintained respectively above the level of the influent water outside the cylindrical devices 6 and above the water in the effluent regions in or communicating with the interiors of the devices 6. Then, at the end of the run, as explained in the patent, all valves except valves 9 and 14 are closed and after the pump has run a few seconds longer, to build up higher pressure against or in the air pockets, the valve 14 is closed, the pump shut off, and the sudden or percussive backwash of the septums obtained by rapidly relieving, i. e. opening the air pocket on the influent side so that the resulting sudden expansion of the air pocket on the effluent side forces the water violently backward from inside to outside of the filter devices 6.

In contrast to the arrangement specifically shown in the patent for providing the influent and effluent air pockets and for conducting the ordinary and backwashing flows of water, the filter support devices 6 of the present apparatus each include a series of vertically spaced bell-shaped devices 24 arranged to clear the inner wall of the septum support and mounted on a central pipe which conducts the filtered water from the bottom of each device 6 to the header pipe 11a. Exteriorly of the devices 6 and the pipe 11a, the entire interior of the shell 21 is accessible to the influent water, i. e. is in communication with the influent side of the filter.

Important advantages of this new arrangement, as well as its further details, are explained below, but its provision of air pockets for the ultimate backwashing step may now be noted. Thus, during a filter run, the influent liquid, i. e. that contained inside the main filter tank 21 but on the outside of filter supports 6, will attain a level at least as high as or higher than that approximately indicated by line C. Since the valve 23, which is a quick opening type valve at the top of the tank, is closed at this stage of the operation, a pocket of air will thus be trapped above the level C; indeed, as the filter bed builds and fills during the run, or perhaps early in the run under certain conditions, the water level will rise above the line C, at least ultimately reaching or approaching the line D, with corresponding compression of the air pocket. There will also be air trapped on the effluent side, within each of the filter supports 6 specifically underneath each of the bell-shaped devices 24. Under each of them, the trapped pocket of air will therefore only allow water to rise to approximately that level, in each, indicated by line A; sometimes the level may be or become higher during the run (e. g. if the water is delivered from the filter against a high back pressure), with corresponding compression of these air pockets. Air will likewise be trapped, forming a further effluent pocket, under the similarly bell-shaped top section 25 of each filter support 6. For better understanding of the air pockets on the effluent side, which are adapted to function simultaneously for the ultimate backwashing, reference may be had to Fig. 2 where liquid is shown inside a filter unit 6 with levels at least no lower than will exist during a normal filtering run. The flow of filtrate will then be through filter surface 26 and down past the edges of the bell-shaped devices 24 to openings 27, then up through the inner pipe 28 to the line or header pipe 11a.

Although the filter surface or septum 26 may be of any suitable porous construction such as shown in my above-cited patent or such as a conventional finely spaced winding of wire, the device is shown as including a particularly effective filter surface which constitutes a sleeve of flexible material, such as flexible plastic, rubber or the like, that contains short slits 29 on the outside surface which enlarge and open into continuous vertical grooves on the inside surface. These slits 29 are preferably arranged in staggered rows as indicated (but shown in a disproportionately enlarged manner, for clarity) on the center filter support 6 in Fig. 1. This filter surface, which more or less snugly overlies the perforated metal support 6, operates to hold a bed of filter material during a filter run. Then during reverse flow cleaning operation, which will be described hereafter, the flexible septum expands and thereby opens each slit to completely dislodge all particles of filter bed or impurity which may be lodged therein.

A further feature of this invention is embodied in the construction of filted supports 6 wherein, as is made possible by the use of the bell devices 24, the effluent pipe 28 extends down to the bottom section 31 of the support and only there communicates with the interior of the cylindrical support, specifically through relatively small sized openings 27 in the section 31 (see Fig. 4) through which the filtrate must therefore pass in order to circulate through the system. By thus withdrawing the liquid from a locality close to the bottom of the support assembly, a sufficient velocity of flow is there maintained to pick up and carry through, i. e. by washing action into the pipe 28, any particles which may have penetrated filter surface 26 at the beginning when a filter bed is being built up. Thus, no particles will be allowed to remain settled at the bottom of the filter supports.

Referring to Fig. 2, details of construction of each filter support 6 will be described. Top section 25 of each unit has suitable means, such as a threaded nipple 32, for communicating connection to, and support by, the header pipe 11a (Fig. 1), e. g. by screwing the nipple into a T connector 33 on the pipe. The top section 25 also has a tapped inside extension 34 which receives a threaded end 35 of the inner pipe 28. This inner pipe 28 has its series of bell-shaped devices 24 tightly fastened thereto in order to form air pockets underneath each of the bells. The lower end of inner pipe 28 is threaded to receive the bottom section 31 as illustrated, i. e. for communication, through the passages 27, with the interior of the septum support 6. Each of the bell-shaped devices 24 has a fluted or notched edge 36 which leaves passageways for the flow of filtrate down inside filter supports 6 to the bottom holes or passages 27 and then up inside the inner pipe 28 to complete the circulation. The filter supports 6 each have their sides 37 constructed of perforated sheet metal (Figs. 2 and 3) or of any suitable material having sufficient strength to support the septum 26. Other types of support for the filter surface can be used such as a wire coil or grid, properly supported at the ends or by the edges of the bells 24 (or other types of filter surface can be mounted on such grid), but a sheet metal cylinder with perforations has been found satisfactory (to carry the septum 26) and relatively inexpensive, the perforations being sufficient in size and number to intersect each vertical groove of the septum 26 at many places. The cylinder 37 is secured between the top and bottom parts 25, 31, as shown, and the cylindrical septum or filter surface 26 is fastened over the cylinder 37 by strap clamps 38 at the ends.

The backwashing process will now be described in further detail so that a main feature of the present invention may be more fully appreciated. At the completion of a run, or, when it would no longer be economical to continue a run, the surface of filter supports 6 must be cleaned. To accomplish this operation by the effective air bump type of reverse flow in the present apparatus, the following steps are involved (see Fig. 1 again): at the end of the run, outlet valve 11 is closed and, as already explained, while valve 15 remains closed and likewise the air vent valve 23, the circulation pump 20 is allowed to continue briefly, to pump water, increasing the pressure and causing the influent water, to rise further (i. e. to the extent, if any, that it may not yet have risen all the way to level D from its beginning level C) and thus stand at approximately the level D in the uppermost part of the tank. At the same time, since all outlet valves are closed, the pressure inside the filter supports 6 will be increased and the liquid level which may have been as low as at A under each bell 24 will rise as much as necessary to reach approximately level B (also see Fig. 2). That is to say, not only is the air pocket over the influent water greatly compressed, but also the air pocket in each one of the several bell-shaped devices 24 of each filter support 6, as likewise the air pockets under the top sections 25. Then upon closing valve 14 and arresting the pump 20, the quick-opening valve 23 will be turned to full open position allowing a sudden escape of the air entrapped above the influent liquid in tank 21. In consequence the pressure of the liquid outside each filter surface 26 is rapidly reduced, causing the air entrapped under each of the bells 24 (including the top sections 25) to expand rapidly and force the effluent liquid in the filter support 6 out violently through the side walls 37 and the septums 26.

Not only does this reverse flow at very high velocity effect a rapid cleaning of the filter surface (in the manner generally described in my cited patent), but it accomplishes such results with unusual uniformity and thoroughness throughout the entire height of each filter device 6. At the locality or zone of the filter surface immediately below each bell 24, the enclosed portion of water is very promptly set in motion, so that water is expelled immediately and rapidly at all such localities, which collectively make up the surface. There is essentially no progressive loss of energy or velocity such as occasioned by inertia of the more remote portions of a long column of water; on the contrary, by causing the air expansion to take place locally and separately, so to speak, at a multiplicity of zones constituting the column, the action is simultaneous and identically effective at all such zones. In consequence, the backwashing step affords a very complete cleaning, dislodging all of the lodged particles, both of foreign material and of the applied diatomaceous earth at all regions of a relatively tall filter surface. Full advantage, throughout each column 6, is also taken of the assistance which is afforded to the cleaning action by the expansion and opening of the slits in the filter surface 26, i. e. the desired action of this septum sleeve as described above.

After the backwashing operation just described has cleaned off the filter surfaces of the septums or filter supports 6, the main tank 21 of the filter unit can be cleaned out by opening the drainage valve 10. Then all remaining sediment may be washed down by pumping more liquid in, with the drain valve 10 still open. Finally drain valve 10 is closed and the system is ready for a new run, including the described pre-coating and other steps.

It will now be appreciated that by means of the present invention, any desired and otherwise feasible length of filter supports 6 may be employed, and an evenly distributed and completely effective action, especially in backwashing, will be had over the entire filter surface of each such device. While other shapes or designs of the filters, e. g. other transverse configurations, can be used in some cases, the cylindrical shape shown has been found very satisfactory, especially with the enclosed bell arrangements and for optimum achievement of the improved results.

Although a specific embodiment of the present invention has been described in accordance with applicable statutes, it is to be understood that the scope of invention herein is not limited thereto but is defined by the following claims.

I claim:

1. A filter element comprising an elongated, hollow, liquid permeable filter member, and inverted vessel means disposed within said member and opening downwardly at localities distributed substantially along the member adjacent the inner side thereof, for trapping and retaining gas at localities distributed longitudinally within the member when the member is filled with liquid.

2. A filter element comprising an elongated, liquid permeable filter member having an influent side and an effluent side, and inverted vessel means disposed along the effluent side of the filter member and opening downwardly at localities distributed longitudinally adjacent the effluent side of the filter member, for trapping and retaining gas at localities distributed longitudinally along the filter member.

3. A filter element comprising a vertically elongated, hollow, liquid permeable filter member, and a plurality of downwardly open gas trap members spaced vertically within said filter member and effective to trap and retain gas adjacent substantially the entire area of said filter member.

4. A filter element comprising means defining at least a portion of an effluent chamber including a fluid permeable filter member having a substantial extent at least in one direction, and inverted vessel means disposed adjacent said filter member and opening downwardly at localities distributed substantially uniformly in proximity to the entire area of the effluent chamber side of the filter member, for trapping and retaining gas at localities substantially uniformly near the filter member throughout its effluent chamber side, when the effluent chamber is filled with liquid.

5. Filter apparatus for a filter system wherein backwashing is performed with the aid of trapped gas, comprising a vertically elongated, hollow, liquid permeable filter member, and a plurality of upwardly closed and downwardly opening vessels distributed vertically within the filter member substantially throughout its entire height.

6. In a filter having a liquid-pervious filter element separating an influent chamber from an effluent chamber, and adapted for backwashing flow of liquid to clean said filter element, by the aid of energy stored in compressed gas, the combination of means for trapping gas above the liquid in said influent chamber, inverted vessel means disposed within the effluent chamber and opening downwardly at localities distributed substantially uniformly adjacent the entire area of the filter element in said effluent chamber, for trapping and retaining gas at localities substantially uniformly near said filter element throughout its area, when the effluent chamber is filled with liquid, means for building up liquid pressure to compress the trapped gases, and means for suddenly venting the gas trapped in said influent chamber, to relieve pressure on the liquid for effectuating rapid reverse flow of liquid through the filter element, distributed throughout its area, upon expansion of the trapped gas in the inverted vessel means.

7. In a filter having a liquid-pervious filter element separating an influent chamber from an effluent chamber, and adapted for backwashing flow of liquid to clean said filter element, by the aid of energy stored in compressed gas, the combination of means for trapping gas above the liquid in said influent chamber, inverted vessel means comprising a plurality of downwardly open vessels disposed within the effluent chamber and distributed adjacent the filter element, for trapping and retaining gas at localities near the filter element, distributed throughout the area of said element within said effluent chamber, when the effluent chamber is filled with liquid, means for building up liquid pressure to compress the trapped gases, and means for suddenly venting the gas trapped in said influent chamber, to relieve pressure on the liquid for effectuating rapid reverse flow of liquid through the filter element, distributed throughout its area, upon expansion of the trapped gas in the inverted vessel means.

8. Filter apparatus for a filter system wherein backwashing is performed with the aid of trapped gas, comprising an upright, hollow, tubular-shaped, liquid permeable filter member defining an effluent chamber, a pipe disposed vertically lengthwise inside said tubular member and communicating with the outside of said tubular member at the top of the latter and opening into said tubular member near the bottom of the latter, for withdrawing liquid which traverses said tubular member from the outside to inside thereof, and a plurality of downwardly opening, bell-shaped devices located vertically spaced and attached to said pipe, for trapping and retaining gas under each device when the tubular member is filled with liquid, said devices being distributed vertically inside the tubular member substantially throughout the height thereof.

9. The apparatus as described in claim 8, wherein each of the bell-shaped devices includes a skirt portion surrounding the pipe in spaced relation thereto and extending adjacent the inner side of the tubular member, said skirt portions of the bell-shaped devices having fluted edges immediately adjacent the inner side of the tubular member, for free vertical flow of liquid along said inner side of the member.

10. Filter apparatus comprising, in combination, means defining an effluent chamber and having an upright liquid-pervious filtering element through which liquid may enter said chamber, means for withdrawing liquid from said chamber, a plurality of downwardly concave means disposed in said chamber in vertically distributed positions adjacent to said element, for entrapping and retaining corresponding pockets of gas within the body of liquid in said chamber, said concave means being arranged to provide communication of liquid throughout said chamber for withdrawal of liquid from the inner side of said filtering element by said withdrawing means, means enclosing the exterior of said filtering element and constituting an influent chamber, and means for introducing liquid to be filtered into said influent chamber.

11. Filter apparatus comprising, in combination, means defining an effluent liquid-receiving chamber and having an upright liquid-pervious filtering element, a plurality of downwardly concave devices vertically distributed along said element in said chamber, for entrapping and retaining corresponding pockets of gas within the liquid, and means defining an influent chamber and exteriorly enclosing said filtering element, said influent and effluent chamber-defining means respectively having liquid inlet and discharge means.

12. In filter apparatus adapted for backwashing with the aid of compressed gas in the effluent side of said apparatus and having liquid inlet and outlet means, said apparatus being adapted to be filled with liquid under pressure received through said inlet means, the combination of influent and effluent chambers respectively connected to said inlet and outlet means, a liquid-pervious filter element separating said chambers, inverted vessel means disposed within the effluent chamber and opening downwardly at localities distributed substantially throughout the entire area of the filter element in said effluent chamber, for trapping and retaining gas at localities substantially uniformly distributed near said filter element throughout its area, when the effluent chamber is filled with liquid, and normally closed means connected to said influent chamber, for releasing pressure in said influent chamber to effectuate reverse flow of liquid through the filter element, distributed throughout its area, upon expansion of the trapped gas in the inverted vessel means.

13. Filter apparatus as described in claim 12, wherein the filter element comprises an upright, elongated liquid-pervious structure constituting a vertical enclosure of the effluent chamber, and wherein the inverted vessel means comprises a multiplicity of inverted, downwardly open, cup-shaped gas trap devices disposed within said elongated structure in vertically spaced relationship, distributed substantially throughout the length of said structure.

References Cited in the file of this patent

UNITED STATES PATENTS

| Number | Name | Date |
|---|---|---|
| 1,591,821 | Heaton | July 6, 1926 |
| 1,771,928 | Jung | July 29, 1930 |
| 1,992,101 | Stuart | Feb. 19, 1935 |
| 2,057,814 | Barrett | Oct. 20, 1936 |
| 2,300,849 | Tauch | Nov. 3, 1942 |
| 2,383,672 | Neisingh | Aug. 28, 1945 |
| 2,423,172 | Booth | July 1, 1947 |
| 2,468,603 | Pew | Apr. 26, 1949 |
| 2,570,132 | Koupal | Oct. 2, 1951 |
| 2,600,458 | Ackley et al. | June 17, 1952 |
| 2,624,465 | Kracklauer | Jan. 6, 1953 |

FOREIGN PATENTS

| Number | Country | Date |
|---|---|---|
| 6,629 | Great Britain | of 1900 |
| 404,309 | Great Britain | Jan. 12, 1934 |
| 592,183 | France | July 28, 1925 |